United States Patent [19]

Morcom

[11] Patent Number: 4,896,215

[45] Date of Patent: Jan. 23, 1990

[54] IMAGING APPARATUS WITH FLEXIBLE INTERFACE FOR CONTROLLING DIFFERENT IMAGE SENSOR TYPES

[75] Inventor: Christopher J. Morcom, Maldon, England

[73] Assignee: English Electric Valve Company Limited, Essex, England

[21] Appl. No.: 245,111

[22] Filed: Sep. 15, 1988

[30] Foreign Application Priority Data

Sep. 18, 1987 [GB] United Kingdom ............... 8721977

[51] Int. Cl.$^4$ .............................................. H04N 5/30
[52] U.S. Cl. ................................ 358/210; 358/213.26
[58] Field of Search ............. 358/210, 213.22, 213.26, 358/313

[56] References Cited

U.S. PATENT DOCUMENTS

| 4,570,184 | 2/1986 | Spidell | 358/217 |
| 4,714,963 | 12/1987 | Vogel | 358/213.26 |
| 4,740,828 | 4/1988 | Kinashita | 358/213.26 |
| 4,750,041 | 6/1988 | Vogel et al. | 358/213.22 |

FOREIGN PATENT DOCUMENTS

1602615 11/1981 United Kingdom.

*Primary Examiner*—Jin F. Ng
*Assistant Examiner*—Stephen Brinich
*Attorney, Agent, or Firm*—Lowe, Price, LeBlanc, Becker & Shur

[57] ABSTRACT

Imaging apparatus includes an image sensor which is connected to a computer, or computer frame store, by an interface. The computer is arranged to generate control signals which are used to control the sequence of signals applied to the image sensor, thereby enabling the interface to be used with a plurality of different image sensor types.

14 Claims, 5 Drawing Sheets

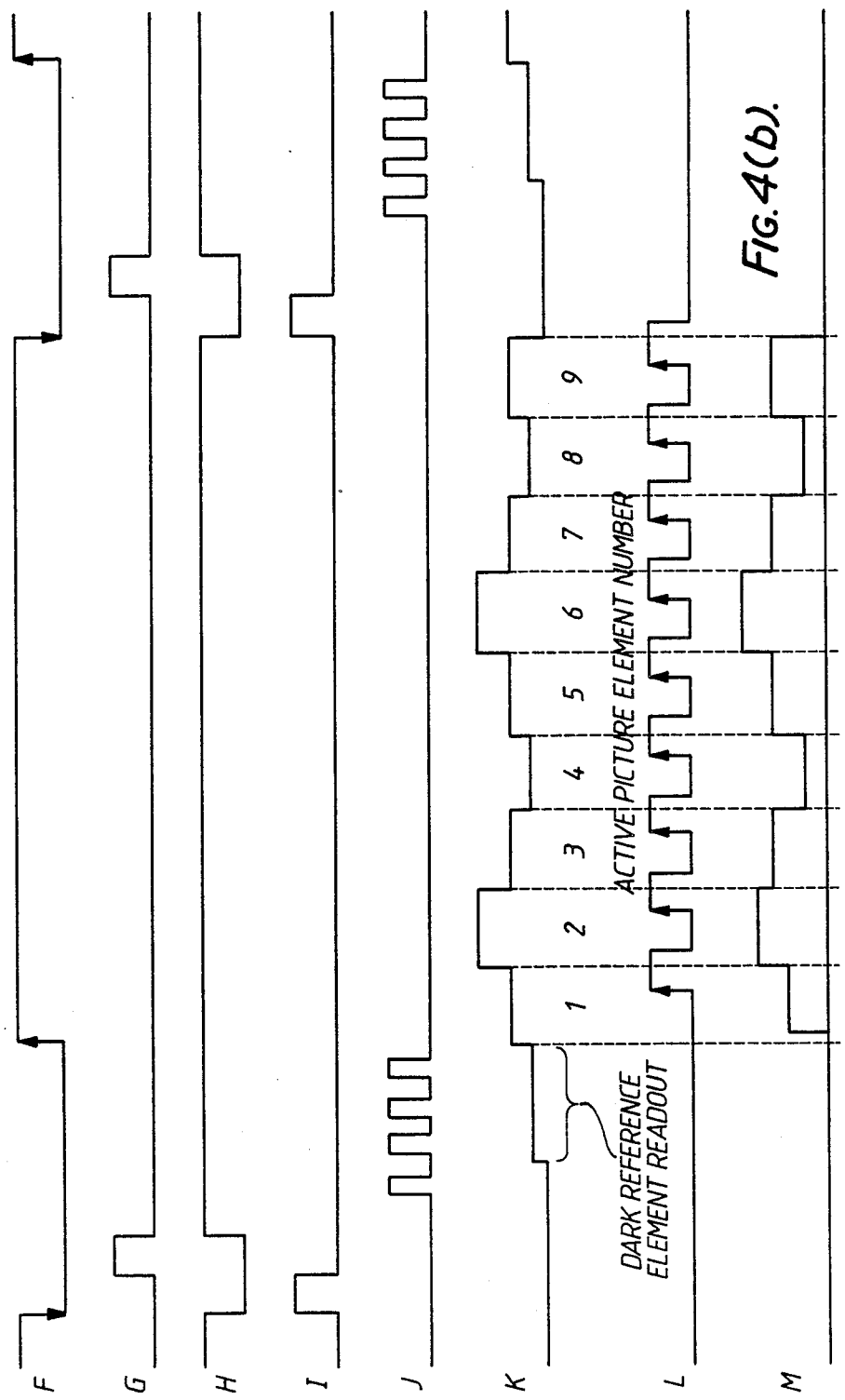

IMAGING APPARATUS WITH FLEXIBLE INTERFACE FOR CONTROLLING DIFFERENT IMAGE SENSOR TYPES

FIELD OF THE INVENTION

This invention relates to imaging apparatus, and more particularly to an interface between an image sensor and a computer or computer frame store.

DESCRIPTION OF THE PRIOR ART

There are a number of different types of image sensor available, such as, for example frame transfer image sensors, interline transfer sensors and MOS imager devices. As these operate in different manners, it has previously been necessary to build a specific interface for a particular combination of image sensor and device into which the readout of the sensor is fed. Such dedicated circuitry is known as "genlock".

When genlock is used, line and field sync pulses are generated to initiate readout of picture information from the image sensor. The field sync pulse initiates readout of each field of picture information and the line sync pulse initiates readout of each horizontal line. After each line sync pulse, the analogue picture information from each horizontal line is sampled, and converted into a sequence of digital numbers which are stored in the computer, or frame store, memory. The rate of sampling is determined by the computer or frame store circuitry. If the image sensor is of the type in which a field of view is imaged onto a continuous surface which is scanned to produce a continuous analogue signal, this approach is acceptable. However, where the image sensor comprises an array of solid state sensors, the line of picture information is a series of discrete analogue levels which correspond to individual picture elements of the array. Unless there is exact matching between the sample rate and the picture element rate, some elements may be sampled twice or samples may be taken during the period between the readout of adjacent picture elements. This introduces inaccuracies and reduces the benefits potentially available when using precise image sensor geometry.

The present invention seeks to provide improved imaging apparatus.

SUMMARY OF THE INVENTION

According to the invention there is provided imaging apparatus comprising an image sensor, a device arranged to receive an output from the image sensor and an interface between them, the interface being arranged to apply a plurality of signals to the image sensor to produce the output, the sequence in which signals are applied being determined by control signals applied to the interface. Usually the device will be a computer or a frame store of a computer. Imaging apparatus in accordance with the invention is particularly advantageous since, by varying the sequence in which the plurality of signals are applied to the image sensor by the interface, a number of different types of image sensor may be employed using the same device and interface. The inventor has realised that, although considerable differences exist between different types of image sensor, certain operations or processes must be performed to all of them to obtain the readout. The first of these processes is integration, which is the period during which photogenerated charge accumulates at the optically sensitive surface of the image sensor. Also, frame initialisation is required to ready the image sensor for readout of the charge present at the photosensitive surface. Another operation which must be performed is that of line initialisation by which the image sensor is readied for readout of a new line of photogenerated charge.

The invention is particularly advantageously employed where the image sensor comprises an array of detector elements, particularly when these are solid state elements. Where an array of discrete detector elements is employed, preferably one of the plurality of signals applied to the image sensor is arranged to read out the content of each element individually. This may be termed picture element readout. This is particularly useful since the signal controlling picture element read out may be derived from a sampling signal of the device to ensure that elements are sampled only once, thus enabling the accuracy available with such an array to be fully utilised.

Preferably, the control signals are derived from the device arranged to receive the output, although a separate external control means could be employed. The signals required to operate an image sensor can normally be derived without difficulty from a computer for example with which the image sensor is interfaced. Preferably the plurality of signals is arranged to control the integration time, and the line readout of the image sensor.

Advantageously, the interface comprises a plurality of lines on which respective ones of the plurality of signals are transmitted and a line arranged to receive the output of the image sensor. Lines could also be included of course for supplying power or biasing to the image sensor.

It is preferred that the interface includes means for reverse clocking of the image sensor. This enables the integration time to be reduced by dumping some of the accumulated charge from sensor elements. This is advantageous in reducing picture blurr when fast moving objects are within the field of view of the image sensor, and can also enable adjustments to be made to suit the mean illumination level of the scene which is viewed.

The plurality of signals may of course be of any type capable of transmitting information, but preferably they comprise pulses, rising and falling edges of which are arranged to control the production of the output of the image sensor.

According to a feature of the invention, an interface for use in imaging apparatus in accordance with the invention comprises input means at which control signals are applied and output means at which the plurality of signals are taken.

The interface may thus comprise circuitry which is wholly or partly controlled by the control signals to obtain the plurality of signals to be applied to the image sensor in the desired sequence.

Some ways in which the invention may be performed are now described with reference to the accompany drawings.

BRIEF DESCRIPTION OF THE DRAWINGS

FIGS. 4A and 4B are schematic pulse diagrams illustrating the operation of the imaging apparatus;

DESCRIPTION OF PREFERRED EMBODIMENT

Figure 1:
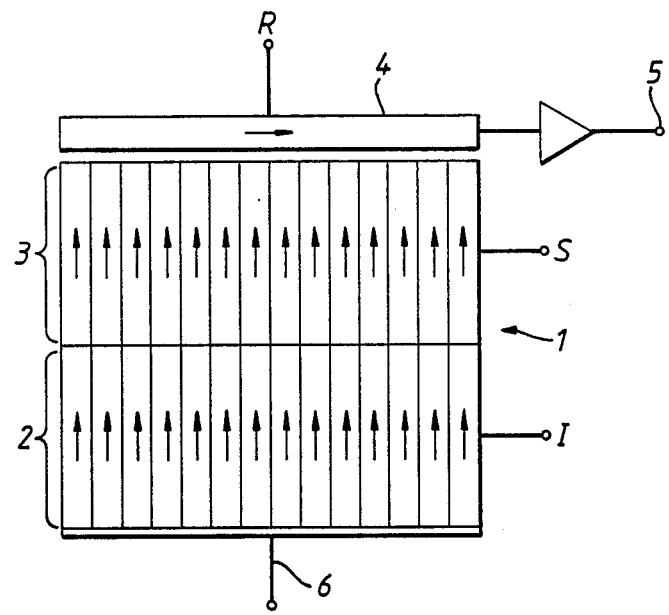
FIG. 1 is a schematic diagram of a frame transfer image sensor.

With reference to FIG. 1, a frame transfer image sensor 1 comprises an imaging area 2 which consists of an array of solid state photosensitive elements, a storage area 3 and a readout area 4. During the integration period, charge is allowed to accumulate in the elements of the imaging area 2. When integration is complete, the I and S electrodes, which control the movement of charge in the imaging and storage areas 2 and 3 repectively, are pulsed to cause a frame of charge from the imaging area 2 to be transfered to the storage area 3, in the direction illustrated by the arrows. Then integration occurs again, during which time line initialisation also takes place, each S electrode pulse cycle shifting a line of charge from the storage area 3 to the readout area 4. Readout electrodes R are controlled to transfer the charge from the readout area 4 to the output 5. If it is desired to have a short integration period, charge may be dumped in a diode drain 6 by reverse clocking.

Figure 2:
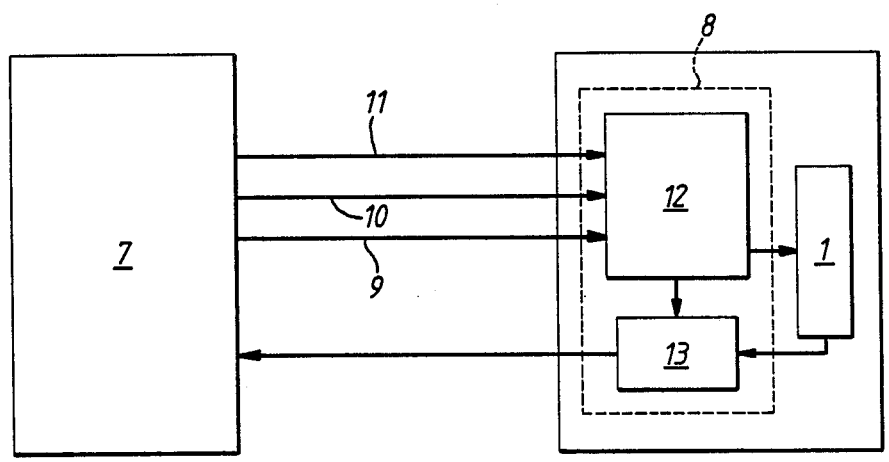
FIG. 2 is a schematic diagram illustrating imaging apparatus in accordance with the invention.

With reference to FIG. 2, the image sensor 1 of FIG. 1 is connected to a computer, or frame store, 7 via an interface 8. The interface 8 has three control line inputs 9, 10 and 11 which are arranged to carry the field control signal, the line readout control signal and the picture element control signal respectively. The interface 8 is such that signals applied on lines 9, 10 and 11 control the sequence and timing of signals applied to the image sensor 1 to control it, as described in greater detail with reference to FIG. 3, and comprises a logic section 12 and video processing circuitry 13. The video processing circuitry 13 is arranged to receive the output of the image sensor 1 and convert it into a video signal which is then transmitted to the computer 7.

Figure 3:
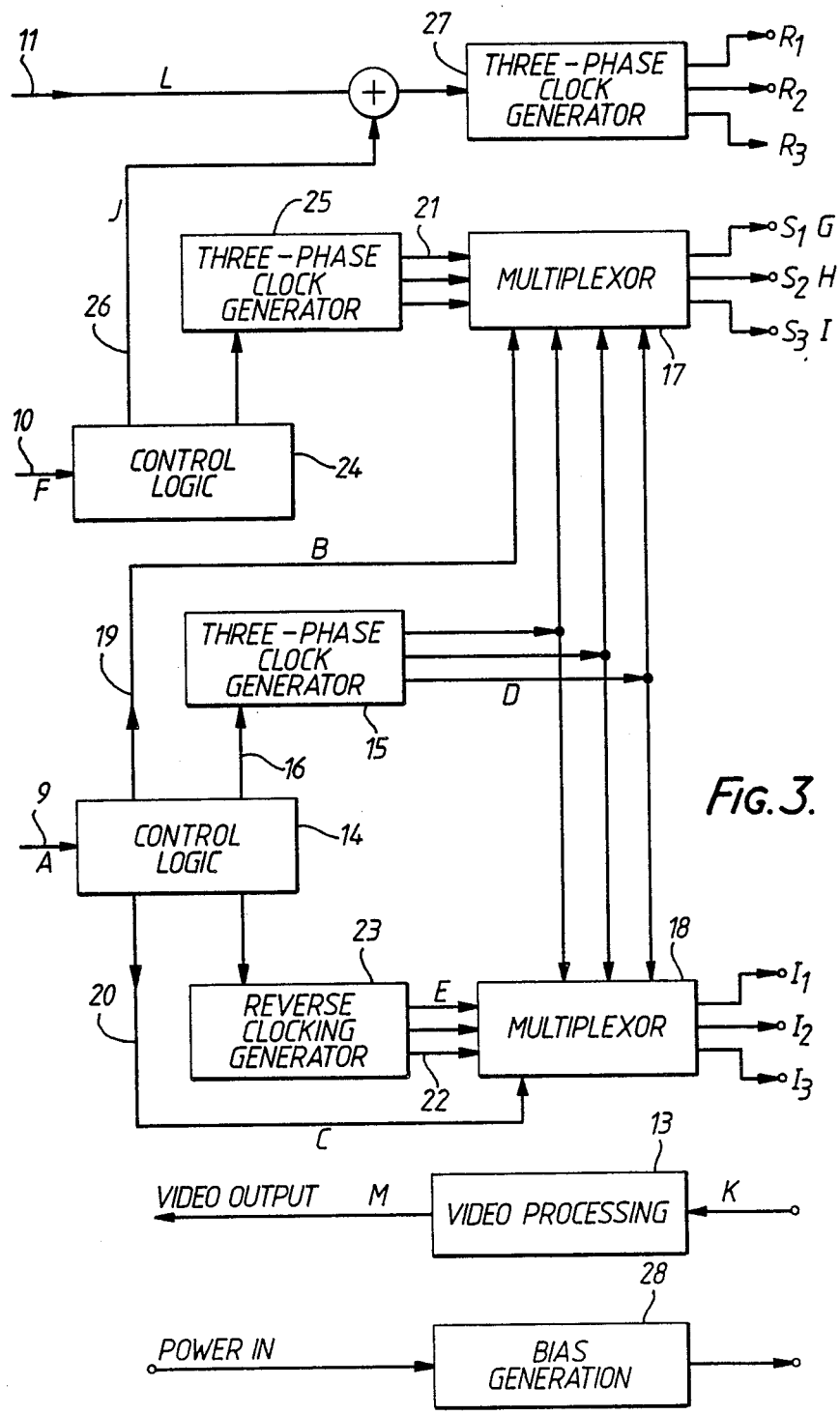
FIG. 3 is a schematic block diagram of the interface of FIG. 2.
Figure 4A:
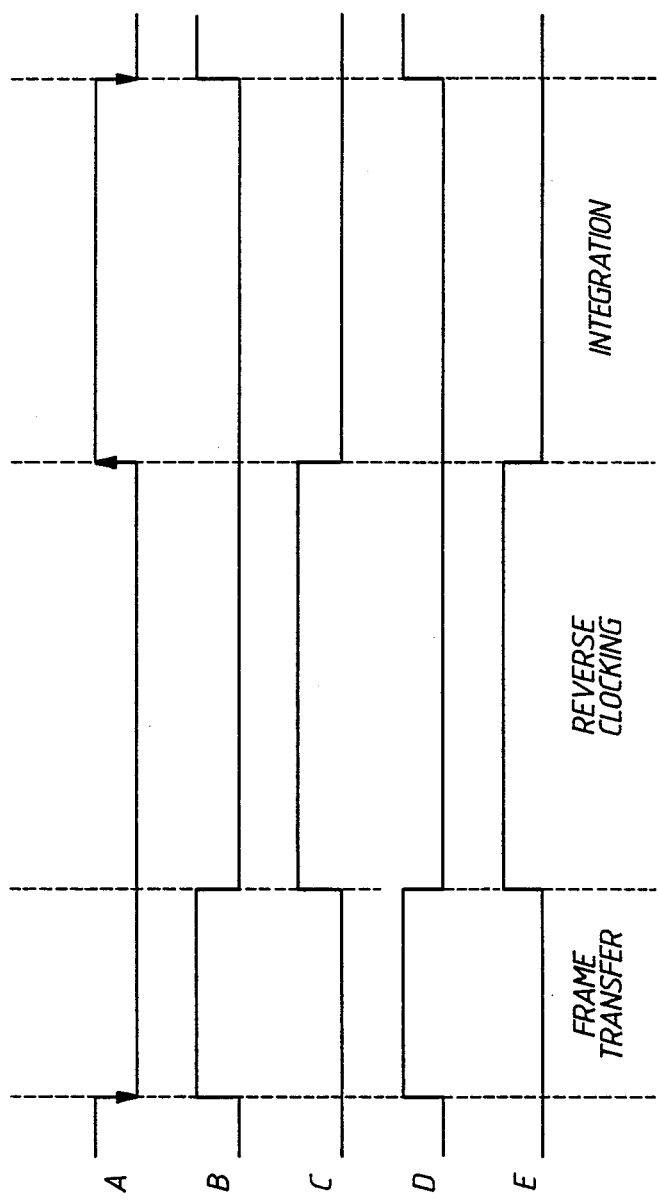

With reference to FIG. 3, which is a schematic block diagram of the interface 8 shown in FIG. 2, the field control signal on control line 9 is aplied to control logic 14. The field control signal is shown at A on FIG. 4a. The control logic 14 is constructed such that the falling edge of a field control pulse causes a three phase clock generator 15 to be enabled for a set number of clock pulses, the enable signal being applied on line 16 to the generator 15. The clock pulses are applied to two switching multiplexors 17 and 18, which are set to accept the clock pulses by signals on lines 19 and 20 respectively. The multiplexor 17 is set by a signal derived from the falling edge of the field control pulse, as shown at B on FIG. 4a, and the multiplexor 18 is set to receive the clock pulses from generator 15 by the previous rising edge of that pulse, as shown at C. The multiplexors 17 and 18 pass the clock pulses to the S and I electrodes of the image sensor 1. Thus, the falling edge of the field control signal pulse causes the storage and image area electrodes S and I to be clocked, the number of clock pulses being sufficient to transfer a frame of charge from the image area 2 to the storage area 3. The frame transfer occurs over the period indicated in FIG. 4a until the set number of clock pulses from clock generator 15 have been transmitted. The switching multiplexors 17 and 18 are switched by control signals B and C on lines 19 and 20 to cease accepting signals from the generator 15 and to receive signals on their other input lines 21 and 22 respectively.

Reverse clocking is then initiated by enabling a reverse clocking generator 23, the duration of its output being shown at E, for a set number of pulses, to cause the image electrodes I to transfer charge contained in the elements of the image area 2 to the diode drain 6. This process continues until the rising edge of the field control signal is received at the control logic 14 and is arranged to stop the reverse clocking generator 23 and set the multiplexor 18 to its state in which it is able to receive clock pulses from generator 15. Integration then begins at the rising edge of the field control signal, as shown on FIG. 4a. Although in this particular embodiment of the invention, it is necessary to pre-set the clock generator 15 to generate the required number of pulses to control the frame transfer and reverse clocking periods, it is of course possible to arrange the logic such that this can be controlled externally using the field control signal.

The line readout control signal is applied on line 10 to control logic 24 and is indicated at line F of FIG. 4b. On the falling edge of the line readout control signal pulse, the control logic 24 causes a three phase clock generator 25 to be enabled for one cycle, the resulting clock pulse being applied via the multiplexer 17 to storage electrodes S1, S2, S3 as shown at lines G, H, and I of FIG. 4b. This causes the transfer of a line of charge from the storage area 3 to the readout area 4. The line readout control signal also initiates readout of dark reference elements via line 26 to enable another three phase clock generator 27 which controls the readout electrodes R. The dark reference enable signal is shown at line J of FIG. 4b, and the corresponding output from the readout area 4 is illustrated at line K of FIG. 4b which shows the signal at the output 5 of the image sensor 1. The dark reference element enable signal is stopped at the rising edge of the line readout signal which also is arranged to initiate the readout of the first active picture element.

The picture element control signal on control line 11, shown at L on FIG. 4b, is applied to the clock generator 27. After each rising edge of the picture element control signal, the clock generator 27 applies a pulse to readout electrodes R and the output register of the readout area 4 is clocked to output the contents of the next picture element. Thus, as shown in FIG. 4b, the first rising edge of the picture element control signal causes the second active picture element to be output at 5, and subsequent rising edges cause contents of the remaining active picture elements to be read out. The output of the image sensor is then applied to the conventional video processing circuitry 13 to produce a video signal M. Line readout of charge contained in the storage area 3 is carried out during the integration period. The picture element control signal is derived from the computer store sampling signal, and is arranged to be at the same rate as it. The video processing circuitry 13 may be included in the interface 8 as may conventional circuitry 28 required to produce bias levels for the image sensor 1.

Figure 5:
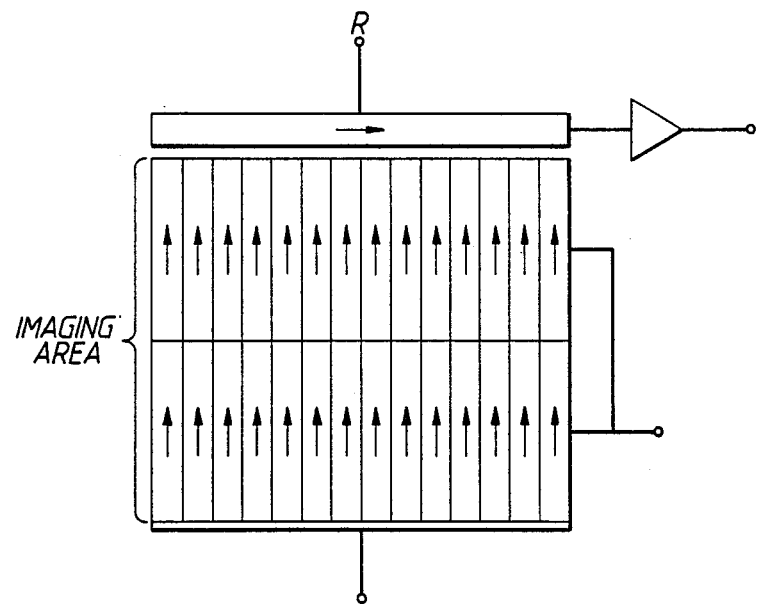
FIG. 5 is a schematic diagram of a frame transfer image sensor arranged to operate in a full frame mode.

The frame transfer image sensor of FIG. 1 is arranged to operate normally. However, the interface 8 may also be employed with a frame transfer image sensor in full frame operation. Such an image sensor is illustrated in FIG. 5 from which it can be seen that there is no storage area, the imaging area extending completely across the device. When the interface 8 is used in connection with a device such as that illustrated in FIG. 5, it is necessary only to set the clock generator 15 so that it runs for sufficient cycles to enable the whole of the charge stored in the imaging area to be transferred to the readout area. Thus, where the imaging area of the full frame transfer device is comparable to that of the storage and imaging areas of the frame transfer device of FIG. 1 taken together, the clock generator 15 must be set to run for twice as many cycles. Also, it is necessary to ensure that the multiplexor 18 is always set so as to receive signals from the clock generator 15, since reverse clocking is not desirable in this mode of operation. As line readout is controlled by the field control signal on line 9, the signal on line 10 is only necessary to enable the dark reference elements on line 26. Although the clock generator 25 is still enabled by the falling edges of the pulses of the line readout control signal, these are not applied to the electrodes because multiplexor 17 is set to receive from the clock generator 15. During line readout, the imaging area is covered to prevent blurring of the image. Control of the cover may be derived from the field control signal. The picture element control signal on line 11 operates in the same manner as described in relation to the image sensor of FIG. 1.

Figure 6:
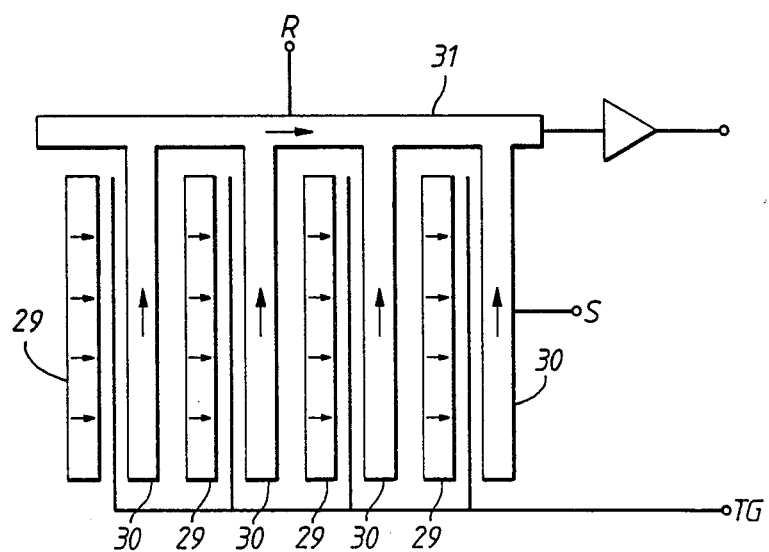
FIG. 6 illustrates schematically an interline transfer image sensor.

Another form of image sensor is that known as the interline transfer type, as illustrated in FIG. 6. In this device the photosensitive areas 29 are interleaved with storage areas 30. In operation, during integration the storage electrodes S are controlled to transfer the stored charge line by line to a readout area 31, and readout electrodes R are arranged to clock the contents of the readout area of 31 to the output. Readout of the stored charge normally occurs simultaneously with integration at the imaging areas 29. It is also possible to use this type of device with the interface 8 described previously. The control signals on the input lines 9 and 10 are arranged to produce one clock pulse from generator 15 at the end of the integration period and then sufficient clock pulses from generator 25 to transfer the charge in storage areas 30 to the readout area 31. It may not be acceptable in some applications to have simultaneous operation of the image electrodes, which in this device are termed transfer gates (TG), and the storage electrodes S. This may be avoided by including, for example a delay line between the output of the multiplexor 17 and the storage electrodes S. Of course, an interface may be devised in which the image electrodes I may be operated in the forward direction independantly of the storage electrodes S. The circuitry of the interface is then more complex but even greater flexibility is then available. The interface 8 may also be used with other types of image sensor, for example it may be used with an MOS imager device.

I claim:

1. Imaging apparatus comprising an image sensor, a device arranged to receive an output from the image sensor and an interface between them, said interface operating to apply a plurality of signals to the image sensor to produce the output, the sequence in which said signals are applied to said image sensor being determined by control signals applied to the interface, thereby enabling said interface to operate with more than one type of image sensor.

2. Imaging apparatus as claimed in claim 1 wherein the image sensor comprises an array of detector elements.

3. Imaging apparatus as claimed in claim 2 wherein one of the plurality of signals applied to the image sensor is arranged to read out the content of each element individually.

4. Imaging apparatus as claimed in claim 3 wherein the said one of the plurality of signals is derived from a sample signal of the device.

5. Imaging apparatus as claimed in claim 1 wherein the plurality of signals is arranged to control the integration time and the line readout of the image sensor.

6. Imaging apparatus as claimed in claim 1 wherein the

7. Imaging apparatus as claimed in claim 1 wherein the plurality of signals comprises pulses, rising and falling edges of which are arranged to control the production of the output of the image sensor.

8. Imaging apparatus as claimed in claim 5 wherein the plurality of signals comprises pulses, rising and falling edges of which are arranged to control the production of the output of the image sensor.

9. Imaging apparatus as claimed in claim 8 wherein the control signals are derived from the device arranged to receive the output.

10. An interface for use in imaging apparatus as claimed in claim 1, the interface including input lines on which the control signals are applied and output lines on which the plurality of signals are transmitted.

11. Imaging apparatus comprising an image sensor, a device arranged to receive an output from the image sensor and an interface between them, the interface operating to apply a plurality of signals to the image sensor to produce the output, the sequence in which said signals are applied being determined by control signals applied to the interface, wherein the control signals are derived from the device arranged to receive the output.

12. Imaging apparatus as claimed in claim 11 wherein the plurality of signals is arranged to control the integration time and the line readout of the image.

13. Imaging apparatus comprising an image sensor, a device arranged to receive an output from the image sensor and an interface between them, the interface operating to apply a plurality of signals to the image sensor to produce the output, the sequence in which said signals are applied being determined by control signals applied to the interface, wherein the interface includes means for reverse clocking of the image sensor.

14. Imaging apparatus comprising an image sensor, a device arranged to receive an output from the image sensor and a variable interface between them, said variable interface controllably operable to interface between any of a plurality of types of image sensor and a device receiving the output therefrom, said interface operating to apply a plurality of signals to the image sensor to produce the output, the sequence in which said signals are applied to said image sensor being variably determined by control signals applied to the interface in accordance with the type of image sensor, thereby enabling said interface to operate with more than one type of image sensor.

* * * * *